2,970,957
REMOVAL OF VANADIUM AND/OR SODIUM FROM PETROLEUM HYDROCARBONS

Roy Purdy Northcott and Ronald Lester, Sunbury-on-Thames, England, assignors to The British Petroleum Company Limited, London, England, a British joint-stock corporation No Drawing. Filed Mar. 21, 1956, Ser. No. 572,814

Claims priority, application Great Britain Mar. 24, 1955

5 Claims. (Cl. 208—251)

This invention relates to the removal of vanadium and/or sodium from petroleum hydrocarbons, more particularly from crude petroleum and crude petroleum residues.

It is known that sodium and vanadium may be removed to a considerable extent from petroleum hydrocarbons by contacting the hydrocarbons at elevated temperature and pressure in the presence of hydrogen with a catalyst consisting of or comprising the oxides of cobalt and molybdenum supported on a metal oxide, preferably alumina. Such catalysts are relatively expensive however, and attempts have been made to find alternative and cheaper materials for effecting removal of the sodium and vanadium. These attempts have to some extent succeeded, bauxite having been suggested, but we have now discovered a still cheaper material that may be used for the purpose in question.

It is known that a catalyst of the kind consisting of or comprising the oxides of cobalt and molybdenum, as such or in combined form, incorporated with a metal oxide support, usually alumina, suffers a permanent loss of activity for desulphurisation after repeated regeneration, but we have now found that the activity of the catalyst for sodium and vanadium removal does not decline at the same rate, and that the catalyst may be used to effect a valuable degree of removal of these elements after its effectiveness for desulphurisation has fallen below an economic level.

According to the present invention therefore, a process for the removal of sodium and/or vanadium from petroleum hydrocarbons comprises contacting the hydrocarbons at elevated temperature and pressure and in the presence of hydrogen with a catalyst of the kind described which has lost activity for desulphurisation after repeated regeneration.

In order to determine whether the catalyst has lost activity for desulphurisation, the catalyst is used to hydrofine a Kuwait crude oil or crude oil residue under the following conditions:

| | |
|---|---|
| Temperature ° F. | 780 |
| Pressure p.s.i.ga. | 1,000 |
| Space velocity v./v./hr. | 1.0 |
| Hydrogen recycle rate s.c.f./b | 4,000 |

If the residue boiling above 371° C. has a sulphur content in excess of 1.5% wt., then the catalyst is said to have lost activity for desulphurisation for the purposes of the present application.

The invention is applicable to the preparation of residual fuels of low sodium and vanadium content, such fuels being especially suitable for the operation of gas turbines and ships' diesel engines.

The invention is also applicable to the removal of vanadium and/or sodium from crude oils and crude oil residues prior to the treatment of the hydrocarbons over a hydrofining catalyst for the removal of sulphur. The hydrofining catalyst may advantageously consist of a fresh catalyst of the kind described.

The process according to the invention may be carried out over a wide range of conditions as follows:

| | | |
|---|---|---|
| Temperature | ° F. | 750–800 |
| Pressure | p.s.i.ga. | 500–1500 |
| Space velocity | v./v./hr. | 0.5–5.0 |
| Gas recycle rate | s.c.f./b | 1,000–10,000 |

The invention will now be described with reference to the following example:

Example

| | |
|---|---|
| Feedstock | Kuwait crude oil. |
| Sulphur content | 2.54% wt. |
| Vanadium content | 24 p.p.m. |
| Sodium content | 6 p.p.m. |
| Pressure | 1,000 p.s.i.ga. |
| Temperature | 780° F. |
| Space velocity | 1.0 v./v./hr. |
| Gas recycle rate | 4,000 s.c.f./b. |

| No. of run | 1 | 2 | 3 | 4 | 5 | 6 | 7 | 8 | 9 | 10 |
|---|---|---|---|---|---|---|---|---|---|---|
| Total catalyst life, hr. on stream | 0–200 | 200–400 | 400–600 | 600–800 | 800–1,000 | 1,000–1,200 | 1,200–1,400 | 1,400–1,600 | 1,600–1,800 | 1,800–2,000 |
| Sulphur content of product, percent weight | 0.45 | 0.57 | 0.62 | 0.61 | 0.74 | 0.80 | 0.90 | 0.95 | 0.98 | 1.01 |
| Sulphur removal, percent | 82.3 | 77.6 | 75.3 | 75.7 | 70.4 | 67.7 | 64.5 | 62.2 | 61.0 | 59.8 |
| Vanadium content of product, p.p.m. | | | | | | 3 | 2 | 5 | 4 | 4 |
| Vanadium removal, percent | | | | | | 88 | 92 | 79 | 83 | 83 |
| Sodium content of product, p.p.m. | | | | 1 | | | | | | 1 |
| Sodium removal, percent | | | | >83 | | | | | | >83 |

It will be seen that while the sulphur removal declined from 80% at the beginning of the test to 60% after 2000 hours on stream and 9 regenerations, the vanadium removal remained substantially constant at an average value of 85%. Under the same process conditions, bauxite will give approximately 70% vanadium removal.

We claim:

1. A process for the removal of sodium and vanadium from petroleum hydrocarbons containing at least one of these substances which comprises contacting said petroleum hydrocarbons at elevated temperature and pressure and in an atmosphere comprised of hydrogen with a spent and unregenerable desulfurization catalyst comprising the oxides of cobalt and molybdenum incorporated with a metal oxide support.

2. A process according to claim 1, which is carried out at a temperature of 750° to 800° F., a pressure of 500 to 1500 p.s.i.ga., a space velocity of 0.5 to 5.0 v./v./hr., and a gas recycle rate of 1000 to 10,000 s.c.f./b.

3. A process for the hydrocatalytic desulfurization of petroleum hydrocarbons which contain at least one of the metal contaminants sodium or vanadium which comprises contacting said petroleum hydrocarbons at elevated temperature and pressure and in an atmosphere comprising hydrogen with a spent and unregenerable desulfurization catalyst which comprises the oxides of cobalt and molybdenum incorporated with a metal oxide support and subsequently contacting said hydrocarbons at elevated temperature and pressure and in the presence of hydrogen with an active cobalt-molybdenum desulfurization catalyst.

4. A process according to claim 3, in which the contacting of said hydrocarbon with said spent and unregenerable desulfurization catalyst is carried out at a temperature of 750° to 800° F., a pressure of 500 to 1500 p.s.i.ga., a space velocity of 0.5 to 5.0 v./v./hr., and a gas recycle rate of 1000 to 10,000 s.c.f./b.

5. A process according to claim 4 wherein the metal oxide support is alumina.

References Cited in the file of this patent

UNITED STATES PATENTS

| | | |
|---|---|---|
| 2,273,298 | Szayna | Feb. 17, 1942 |
| 2,337,358 | Szayna | Dec. 21, 1943 |
| 2,378,531 | Becker | June 19, 1945 |
| 2,401,334 | Burk et al. | June 4, 1946 |
| 2,689,825 | McKinley | Sept. 21, 1954 |
| 2,717,855 | Nicholson | Sept. 13, 1955 |
| 2,758,060 | Porter et al. | Aug. 7, 1956 |
| 2,846,358 | Bieber et al. | Aug. 5, 1958 |